Patented May 23, 1933

1,911,174

UNITED STATES PATENT OFFICE

DAVID A. LEGG, OF TERRE HAUTE, INDIANA, ASSIGNOR TO COMMERCIAL SOLVENTS CORPORATION, OF TERRE HAUTE, INDIANA, A CORPORATION OF MARYLAND

ART OF BUTYL-ACETONIC FERMENTATION

No Drawing.   Application filed November 27, 1929. Serial No. 410,258.

My invention relates to the process of preparing butyl alcohol and acetone by fermentation. More particularly, it refers to a method of obtaining bacterial cultures capable of producing these substances, which are not subject to periods of sluggish fermentation.

Weizmann in United States Patent No. 1,315,585 of September 9, 1919, has described a process whereby normal butyl alcohol, acetone, and ethyl alcohol in approximately the proportions of 6:3:1 are obtained by fermenting a carbohydrate mash with an organism which has been variously classified under the names of *B. amylobacter*, *B. granulobacter pectinovorum*, *Clostridium acetobutylicum* (Weizmann), etc. On inoculating a sterile carbohydrate, as for example, corn meal mash with a culture of this organism and allowing it to ferment at about 37° C. certain typical reactions usually ensue if the culture is a normal healthy one and no contaminating organisms capable of reducing excessive acid production are present in appreciable quantities. As a general rule, such a normal fermentation is completed in the course of from 24 to 60 hours, during which time a slimy firm head or cap of unfermented material is formed and the underlying liquor becomes somewhat cloudy. During the course of the fermentation the acidity of the medium rises to a peak requiring for 10 c. c. of mash between 4 and 6 c. c. of N/10 soda solution to neutralize to phenolphthalein and then breaks from the peak within a few hours to a final acidity of 2 to 3 c. c. of 0.1N sodium hydroxide per 10 c. c.

In the commercial scale production of butyl alcohol and acetone by fermentation two outstanding types of fermentation difficulties have been encountered. One of these has been for convenience designated as "contaminated fermentations" and is caused by the accidental presence of other forms of bacteria than those producing butyl alcohol and acetone. The most common forms of contaminating organisms met with in this type of fermentation are the so-called thermobacterium group of lactic acid organisms including *B. volutans*, *casei*, etc., the group of organisms producing mannitol and ethyl alochol. The presence of such organisms causes either or both of two things equally detrimental to good results. These organisms multiply very rapidly leading to an increase in acidity which may inhibit the growth and development of the butyl organisms. In such a case the time required for the fermentation to be completed is considerably lengthened and at the same time poor yields are obtained due to the action of the stunted or weakened culture. In addition to the harmful effect of these foreign organisms upon the butyl organism itself, their presence leads to another equally important undesirable effect. Being present in such large quantities they consume a large proportion of the carbohydrate designed for the use of the butyl organisms, with the result that the final yields of butyl alcohol and acetone from a particular lot of contaminated mash are materially reduced below those obtained from a normal uncontaminated culture. The use of contaminated culture also presents certain other disadvantages which need not be mentioned at this point.

In the past, poor fermentations and yields have at times been obtained even when no signs of contaminating organisms could be detected. Marked differences are observed between normal fermentations and these, as they sometimes are termed "sluggish" fermentations. In the case of the latter, large fermenters containing 40-50 thousand gallons of an 8%-9% corn meal mash require 75-100 hours and sometimes longer for the fermentation to be completed. Sluggish fermentations show a marked inhibition or often complete absence of head formation in from 24 to 48 hours, the liquor usually being clear and mobile instead of cloudy and viscous as in a normal fermentation. The acidity of the fermenting medium rises to a peak of between 5 and 7 c. c. of 0.1N sodium hydroxide per 10 c. c. of mash (phenolphthalein end point) with prolongation of the peak for 8 hours or much longer, and a slow break to a final acidity which may be in some cases normal and in other cases above normal. Abnormal forms appear among the bacilli and generally the final yields of butyl alcohol and acetone are from 10% to 15% below those obtained from normal fermentations. Even tho no microscopic evidence of the presence of other forms of living organisms is available, the recurrent and epidemic character of the sluggishness suggests that it is a "disease" of the butyl organisms caused by the presence of an ultra-microscopic organism possibly of parasitic character.

In United States Patent No. 1,668,814 granted May 8, 1928, I have disclosed a method whereby the difficulties caused by sluggish fermentation of the above-described character may be successfully overcome. This method consists substantially of immunizing the butyl organisms by repeatedly subcultivating them in the presence of the filtrate from a sluggish fermentation, the cultures being "heat shocked" before each transfer. In carrying out the process in this manner, a sterile carbohydrate mash consisting for example of 6% corn mash is prepared and inoculated with a spore culture of butyl-acetonic bacilli. It is then "heat-shocked" for three minutes at 100° C. after which there is added a small portion (one or more drops) of clear liquid obtained from a carbohydrate mash undergoing a sluggish butyl-acetonic fermentation by filtering the mash first to remove all coarse suspended solids and second thru a Berkefeld or other bacterial filter to remove bacteria. Fermentation is then allowed to proceed at a temperature of about 37° C. for four or more days, i. e., until spores have developed. This spore culture is then used to inoculate fresh corn mash which is again "heat-shocked" for about three minutes at 100° C., and treated with two drops of the filtrate as previously mentioned. The second fermentation is allowed to proceed as before and additional transfers with shocking and with filtrate addition are made. At the end of from about 10 to about 17 such treatments the culture thus obtained in spore form at the end of the last treatment will ordinarily be found to be immunized in respect to sluggish fermentation.

I have now discovered that butyl-acetonic bacilli may be immunized against sluggishness by methods differing somewhat from those described above. Instead of "heat-shocking" as previously specified for the purpose of destroying all vegetative cells present in the medium, I have found that this step of the process may be satisfactorily carried out in a number of other ways. For example, instead of inoculating a sterile carbohydrate mash with a culture taken directly from a fermenting mash, "heat-shocking", adding a few drops of liquid containing the supposed ultra-virus, allowing fermentation to take place, etc., I have now found that I may proceed as follows. A sterile carbohydrate mash consisting, for example, of 6% corn mash is prepared and inoculated with a pure culture of butyl-acetone bacilli. To this is then added a small portion, say one or more drops, of clear liquid obtained from a carbohydrate mash undergoing a sluggish butyl-acetonic fermentation by filtering the mash first to remove all solids and second thru a Berkefeld or other bacterial filter to remove bacteria. Fermentation is then allowed to proceed at a temperature of about 37° C. When the fermentation is complete the mash is allowed to stand for a period of from 4 days to a month for the purpose of allowing all vegetative organisms present to die, thus leaving in the mash only the spores of the butyl-acetonic bacilli which remained sufficiently vigorous after being attacked by the ultra-virus organism to reach the spore-forming stage. The general assumption is that the weaker and more susceptible organisms will have been so attacked and further weakened by the action of the ultra-virus—which, it will be recalled, is thought to be of parasitic character living on the butyl-acetonic organism and not upon the carbohydrate—that only those organisms which are least susceptible to the action of the ultra-virus organisms will reach the spore-forming stage of development.

The presence of vegetative forms of organisms remaining in the mash may be determined by using a small amount of the mash as the inoculum for a sterile 6% corn mash. If fermentation commences in less than 12–16 hours vegetative cells are probably still alive, and it is necessary to allow the mash to stand for a further period of time. When it is determined that all of the vegetative forms are dead, the operation may be repeated substantially as has just been described, using the butyl-acetonic bacilli spores obtained from the previous fermentation as the inoculum for a new lot of sterile 6% corn mash and again adding a small amount of liquid containing the ultra-virus organism, allowing fermentation to take place and the resulting mash to stand until all vegetative cells are dead. The operation may then be repeated a sufficient number of times to render the resulting butyl-acetonic bacilli completely resistant to the action of the ultra-virus organisms, and comparative tests of treated and untreated cultures show that sluggish fermentation and/or lowered yields are not produced by the addition of the ultra-virus organisms to the treated culture. Ordinarily from about 10 to about 17 such treatments are sufficient to give a completely "immunized" culture. In some cases, however, it has been found that a different number of treatments is required, and it is specifically understood that I do not restrict myself to the use of any particular number of sub-cultivations.

Similar results may be obtained in a considerably shorter length of time by adding to a culture, prepared as above described, after it has attained 48 to 72 hours growth, an amount of a toxic material sufficient to destroy all vegetative forms of organisms present but not sufficient to have any appreciable effect upon the spore forms. Suitable materials are mineral acids, phenol, cresols, mercurochrome, or other substance having a bactericidal action. The amount of the toxic material required will depend upon the particular material used, the time of treatment, etc. Whatever material is employed, care should be taken not to use sufficient of the toxic material so that at the dilution attained in the succeeding transfer it will still have an appreciable toxic effect upon the organism.

As examples of satisfactory methods of employing toxic substances for the purposes of destroying the vegetative forms of organism in my new method of immunizing butyl-acetonic bacilli, I may add to the culture being treated with the ultra-virus organism and which has been allowed to ferment for 48 to 72 hours, say 0.1% of sulphur dioxide as sodium sulfite, or 0.5% or more of phenol or cresol. After allowing these materials to act for six hours or more a portion of the resulting mash is employed to inoculate a new lot of sterile 6% corn mash to which is then added a few drops of the liquid containing the ultra-virus organism. Fermentation is then allowed to take place as usual and the operation repeated, as hitherto specified, a sufficient number of times to render the butyl-acetonic bacilli completely resistant against the ultra-virus organism.

Instead of using a toxic material of the character specified above, sufficient mineral acid is added to the mash which has been allowed to ferment for 48–72 hours, to lower its hydrogen ion concentration to a value of about pH2.5. The mash is then allowed to stand for two hours or longer and a portion of the resulting mash used as the inoculum for a new lot of sterile mash.

Still another method of destroying the vegetative organisms is to expose the clear liquid from a culture being immunized to the action of ultra-violet light. For example, if the clear liquid is exposed in a 1 centimeter quartz tube to the action of the Uviarc mercury lamp at a distance of 10 inches for a period of 10 minutes the vegetative forms will be destroyed and only spores remain.

Shaking in a shaking machine and drying out at low temperatures are other alternative methods which may also be employed in my process for destroying the vegetative cells and leaving only the spores.

Cultures of the butyl-acetone bacilli, which have been immunized or made resistant against the agency causing sluggish fermentation by any of the different modifications of my new process described above have distinct advantages over other similar cultures which have not been subjected to the immunizing treatment, in that they give much more constant and uniform results than is possible from non-immunized cultures. In general, higher yields of solvents are produced by these immunized cultures both under ordinary conditions and during periods when non-heated cultures show symptoms of sluggish fermentation and give low yields.

It is understood, of course, that the procedure outlined above may be suitably modified in a number of ways without leaving the concept of my invention. For example, different means may be used for destroying the attenuated vegetative cells, toxic materials, and concentrations of toxic materials different from those specified may be employed; the cultures may also be treated for either longer or shorter periods of time than have been used in the example cited above, and particular cultures may require treatment either a greater or lesser number of times than specified, in order to be rendered satisfactorily immunized. In place of sterile corn mash I may employ any fermentable carbohydrate of either saccharin or amylaceous character.

Now having described my invention, I claim the following as new and novel.

1. Process for producing an immunized culture of butyl-acetone bacilli which comprises repeatedly sub-cultivating said bacilli in carbohydrate media in the presence of carbohydrate which is undergoing sluggish butyl-acetonic fermentation, and eliminating the vegetative cells at ordinary temperatures previous to each sub-cultivation.

2. Process for producing an immunized culture of butyl-acetone bacilli which comprises repeatedly sub-cultivating said bacilli in carbohydrate media in the presence of a Berkefeld filtrate of a carbohydrate mash which is undergoing sluggish butyl-acetonic fermentation, and eliminating the vegetative cells at ordinary temperatures previous to each transfer.

3. Process for producing an immunized culture of butyl-acetone bacilli which comprises sub-cultivating said bacilli ten or more times in a carbohydrate medium in the presence of a portion of a Berkefeld filtrate of a carbohydrate mash which is undergoing sluggish butyl-acetonic fermentation, and eliminating the vegetative cells at ordinary temperatures previous to each sub-cultivation.

4. In a process for producing an immunized culture of butyl-acetone bacilli, the step which comprises eliminating the vegetative cells at ordinary temperatures previous to each sub-cultivation.

5. Process for producing an immunized culture of butyl-acetone bacilli which comprises repeatedly sub-cultivating said bacilli in carbohydrate media in the presence of carbohydrate which is undergoing sluggish butyl-acetonic fermentation, and eliminating the vegetative cells previous to each sub-cultivation at temperatures not substantially above normal fermentation temperature.

6. Process for producing an immunized culture of butyl-acetone bacilli which comprises repeatedly sub-cultivating said bacilli in carbohydrate media in the presence of a Berkefeld filtrate of a carbohydrate mash which is undergoing sluggish butyl-acetonic fermentation, and eliminating the vegetative cells previous to each sub-cultivation at temperatures not substantially above normal fermentation temperature.

7. Process for producing an immunized culture of butyl-acetone bacilli which comprises sub-cultivating said bacilli ten or more times in a carbohydrate medium in the presence of a portion of a Berkefeld filtrate of a carbohydrate mash which is undergoing sluggish butyl-acetonic fermentation, and eliminating the vegetative cells previous to each sub-cultivation at temperatures not substantially above normal fermentation temperature.

8. In a process for producing an immunized culture of butyl-acetone bacilli, the step which comprises eliminating vegetative cells previous to each sub-cultivation at temperatures not substantially above normal fermentation temperature.

9. Process for producing an immunized culture of butyl-acetone bacilli which comprises repeatedly sub-cultivating said bacilli in carbohydrate media in the presence of carbohydrate which is undergoing sluggish butyl-acetonic fermentation, and eliminating the vegetative cells previous to each sub-cultivation by adding to the culture a quantity of a toxic agent sufficient to destroy the vegetative cells, but insufficient to destroy the spores.

10. Process for producing an immunized culture of butyl-acetone bacilli which comprises repeatedly sub-cultivating said bacilli in carbohydrate media in the presence of a Berkefeld filtrate of a carbohydrate mash which is undergoing sluggish butyl-acetonic fermentation, and eliminating the vegetative cells previous to each sub-cultivation by adding to the culture a quantity of a toxic agent sufficient to destroy the vegetative cells, but insufficient to destroy the spores.

11. Process for producing an immunized culture of butyl-acetone bacilli which comprises sub-cultivating said bacilli ten or more times in a carbohydrate medium in the presence of a portion of a Berkefeld filtrate of a carbohydrate mash which is undergoing sluggish butyl-acetonic fermentation, and eliminating the vegetative cells previous to each sub-cultivation by adding to the culture a quantity of a toxic agent sufficient to destroy the vegetative cells, but insufficient to destroy the spores.

12. In a process for producing an immunized culture of butyl-acetone bacilli, the step which comprises eliminating vegetative cells previous to each sub-cultivation by adding to the culture a quantity of a toxic agent sufficient to destroy the vegetative cells, but insufficient to destroy the spores.

13. Process for the production of butyl alcohol and acetone which comprises preparing a sterile carbohydrate mash and inoculating said mash with a culture of butyl-acetone bacilli, the said culture having been previously sub-cultivated in carbohydrate media in the presence of carbohydrate which is undergoing sluggish butyl-acetonic fermentation, the attenuated vegetative cells having been eliminated previous to each transfer in said sub-cultivating process at temperatures not substantially above normal fermentation temperature.

14. Process for the production of butyl alcohol and acetone which comprises preparing a sterile amylaceous mash and inoculating said mash with a culture of butyl-acetone bacilli, the said culture having been previously sub-cultivated in carbohydrate media in the presence of carbohydrate which is undergoing sluggish butyl-acetonic fermentation, the vegetative cells having been eliminated previous to each sub-cultivation in said sub-cultivating process at temperatures not substantially above normal fermentation temperature.

In testimony whereof I affix my signature.

DAVID A. LEGG.

CERTIFICATE OF CORRECTION.

Patent No. 1,911,174. May 23, 1933.

DAVID A. LEGG.

It is hereby certified that error appears in the printed specification of the above numbered patent requiring correction as follows: Page 3, line 111, claim 2, for "transfer" read "sub-cultivation"; page 4, line 83, claim 13, strike out the word "attenuated", and line 10, for "transfer" read "sub-cultivation"; and that the said Letters Patent should be read with these corrections therein that the same may conform to the record of the casein the Patent Office.

Signed and sealed this 15th day of August, A. D. 1933.

M. J. Moore.

(Seal) Acting Commissioner of Patents.